United States Patent Office 2,948,731
Patented Aug. 9, 1960

2,948,731

DERIVATIVES OF THIAZOLINE-2-ONES

George de Stevens, New Providence, N.J., assignor to Ciba Pharmaceutical Products, Inc., Summit, N.J., a corporation of New Jersey No Drawing. Filed Dec. 13, 1957, Ser. No. 702,539

16 Claims. (Cl. 260—293.4)

This invention relates to a new series of cycloalkano [d]thiazoline-2-ones, the salts and quaternary compounds thereof. More specifically it relates to 3-R-(Z-cycloalkano)[d]thiazoline-2-ones, in which R stands for hydrogen or a hydrocarbon radical, and wherein the radical Z represents a tertiary amino group or a tertiary amino-lower alkyl group, Z being attached to one of the carbon atoms of the cycloalkano ring, which contains from 5 to 7 carbon atoms as ring members and is condensed to the d-bond of the thiazoline-2-one ring, the salts or quaternary ammonium compounds thereof, as well as process for the preparation of such compounds.

The radical R stands primarily for hydrogen or a lower hydrocarbon radical having from 1 to 8 carbon atoms, particularly a lower alkyl radical, e.g. methyl, ethyl, propyl, isopropyl, butyl, pentyl or neopentyl; or an alkenyl radical, e.g. allyl or methylallyl; a cycloalkyl radical, e.g. cyclopentyl or cyclohexyl; a cycloalkyl-lower alkyl radical, e.g. 3-cyclopentylpropyl or 2-cyclohexyl-ethyl; an aryl radical, e.g. phenyl or naphthyl; or an aralkyl radical, e.g. benzyl or phenylethyl. Furthermore, such lower hydrocarbon radicals may contain functional groups, such as nitro groups; amino groups, e.g. dimethylamino or piperidino; hydroxyl groups; lower alkoxy groups, e.g. methyoxy; acyloxy, e.g. acetoxy; or halogen atoms, e.g. chlorine or bromine.

The group Z stands for a tertiary amino group or a tertiary amino-lower alkyl group. The lower alkyl radical in a tertiary amino-lower alkyl group represents a lower alkylene radical such as a 1,1-ethylene, a 1,2-ethylene, a 1,2-propylene, a 1,3-propylene, a 1,4-butylene or especially a methylene radical, linking the nitrogen atom of the tertiary amino group with one of the carbon atoms of the cycloalkano ring.

The tertiary amino group stands for an N,N-di-lower hydrocarbon-amino group, the lower hydrocarbon radicals of which contain from 1 to 8 carbon atoms and are more especially lower alkyl radicals, e.g. methyl, ethyl, propyl, isopropyl or butyl; lower alkenyl radicals, e.g. allyl; cycloalkyl radicals, e.g. cyclopentyl or cyclohexyl; aryl radicals, e.g. phenyl; or aralkyl radicals, e.g. benzyl. Such lower hydrocarbon radicals may also contain additional substituents, for example hydroxyl groups, such as free hydroxyl, etherified hydroxyl, e.g. methoxy or ethoxy, or esterified hydroxyl, e.g. chlorine atoms such as chlorine or bromine, or acetoxy; or amino groups, such as free amino, secondary amino or tertiary amino, e.g. dimethylamino. One of the lower hydrocarbon radicals may also be replaced by a heterocyclic radical such as a pyridino radical, e.g. 3-pyridino or 3-pyridino-methyl. Therefore, such N,N-di-lower hydrocarbon-amino groups are, for example, dimethylamino, diethylamino, dipropyl-amino, di-hydroxyethyl-amino, N-cyclopentyl-N-methyl-amino or N-(3-pyridino-methyl)-N-methyl-amino groups.

The tertiary amino group stands also for an N,N-lower alkylene-imino group, the alkylene radical of which contains from 4 to 6 carbon atoms and may be a pure carbon atom chain or such carbon chain may be interrupted by heteroatoms such as oxygen, sulfur or nitrogen and form an oxa-, a thia- or an aza-alkylene radical; when taken together with the nitrogen atom such lower alkylene chain may form, for example, a pyrrolidino, a piperidino, a hexamethyleneimino, a morpholino, a thiamorpholino or a piperazino group, which groups may be unsubstituted or may contain substituents. Such substituents are, for example, lower hydrocarbon radicals containing from 1 to 7 carbon atoms, such as lower alkyl, e.g. methyl, ethyl, propyl or isopropyl; lower alkenyl, e.g. vinyl or allyl; lower alkinyl, e.g. ethinyl; lower cycloalkyl, e.g. cyclopentyl or cyclohexyl; aryl, e.g. phenyl; or aralkyl, e.g. benzyl. Cyclic radicals, such as, lower cycloalkyl or aryl may also be condensed to the N,N-lower alkyleneimino group; an example for such a group is a 1,2,3,4-tetrahydro-quinoline group. Furthermore such lower hydrocarbon substituents may contain additional substituents, for example, amino groups, such as primary amino, secondary amino, e.g. methyl-amino, ethylamino, cyclohexyl amino; or tertiary amino, e.g. dimethylamino, diethylamino, methyl-cyclopentyl-amino, piperidino, morpholino or 4-substituted piperazino; or hydroxyl groups, for example, free hydroxyl, etherified hydroxyl, e.g. methoxy, ethoxy or penhoxy; or esterified hydroxyl, e.g. acetoxy, benzoyloxy, carbamyl-oxy or halogen atoms such as chlorine or bromine. Other substituents attached to the alkylene radical of the N,N-lower alkylene-imino group are, for example, hydroxyl groups, e.g. free hydroxyl; etherified hydroxyl, e.g. methyoxy, ethoxy, dimethylaminoethoxy, diethyl-aminoethoxy, phenoxy, or 4-aminophenoxy; or esterified hydroxyl, e.g. acetoxy or halogen atoms such as chlorine or bromine; or carboxyl groups such as free carboxyl or esterified carboxyl, e.g. carbomethoxy or carbethoxy; or amino groups, such as tertiary amino, e.g. dimethyl-amino. It is to be understood, that several of these substituents may appear on one N,N-lower alkylene-imino group. Specific examples of N,N-alkyleneimino groups are, for example, pyrrolidino, 2-methyl-pyrrol-idino, piperidino, 2-methyl-piperidino, 3-methyl-piperidino, 4-methyl-piperidino, 3-ethyl-piperidino, 2,3-di-methyl-piperidino, 2,4-dimethyl-piperidino, 3,5-dimethyl-piperidino, 6-methyl-3-ethylpiperidino, 4-dimethylamino-ethyl-piperidino, 3-hydroxy-piperidino, 3-methoxy-piperidino, 3-acetoxy-piperidino, 2-hydroxymethyl-piperidino, 3-hydroxymethyl-piperidino, 4-hydroxymethyl-piperidino, 3-(1-hydroxyethyl)-piperidino, 3-(2-hydroxyethyl)-piperidino, or 3-(3-hydroxypropyl)-piperidino, 3-acetoxy-methyl-piperidino, 4-acetoxymethyl-piperidino, 3-meth-oxymethyl-piperidino, 3-carbamyloxymethyl-piperidino, 1, 2,3,4-tetrahydroquinolino, hexamethyleneimino, morpholino, thiamorpholino, 4-methylpiperazino, 4-hydroxy-ethyl-piperazino or 4-acetoxyethyl-piperazino.

In addition to the tertiary amino group or the tertiary amino-lower alkyl group, the cycloalkane ring may contain as additional substituents, for example, lower hydrocarbon radicals, such as lower alkyl radicals, e.g. methyl or ethyl; lower alkenyl radicals, e.g. vinyl or alkyl; cycloalkyl radicals, e.g. cyclopentyl or cyclohexyl; cycloalkenyl radicals, e.g. cyclopentenyl or cyclohexenyl; aryl radicals, e.g. phenyl; aralkyl radicals, e.g. benzyl; hydroxyl groups; etherified hydroxyl groups, e.g. methoxy; or esterified hydroxyl groups, e.g. acetoxy or benzoyloxy.

Salts of the cycloalkano[d]thiazoline-2-ones of this invention are particularly therapeutically suitable acid addition salts, especially those with inorganic acids, such as, hydrohalic acids, e.g. hydrochloric or hydrobromic acid; perchloric, nitric or thiocyanic acid; sulfuric or phosphoric acids; or those with organic acids, such as, formic, acetic, propionic, glycolic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methane sulfonic, ethane sulfonic, hydroxyethane sulfonic, ethylene sulfonic, benzene sulfonic, p-toluene sulfonic, naphthalene sulfonic or sulfanilic acid or methionine, tryptophane, lysine or arginine. Optically active acids such as the D- or L-tartaric acid may also be used.

Quaternary ammonium compounds of the cycloalkano[d]thiazoline-2-ones of this invention are particularly those formed with lower alkyl halides, e.g. methyl chloride, methyl bromide, methyl iodide or ethyl bromide; or with lower alkyl sulfates, e.g. dimethyl or diethyl sulfates; or the corresponding quaternary ammonium hydroxides or the salts thereof with other acids.

The compounds, their salts or quaternary ammonium compounds may also be obtained as hemihydrates, monohydrates, sesquihydrates or polyhydrates.

The compounds of this invention contain at least one asymmetric carbon atom, namely the carbon atom of the cycloalkane ring to which the tertiary amino or the tertiary amino-lower alkyl group is attached. They can therefore exist as the optically inactive racemate, the d,l-form, or as the optically active antipodes, the d-forms and the l-forms. For example, the thiazoline-2-one of the formula:

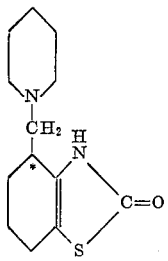

in which the asterick marks the asymmetric carbon atom, can be obtained in the racemic form, which may be resolved into the optically active antipodes. Compounds, having additional optical centers such as, for example, a compound of the formula:

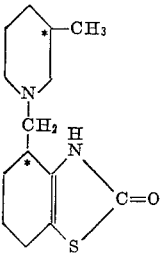

may exist in several racemic forms, for example, as two racemates, which may be resolved into a multitude of optically active antipodes, for example, into four.

The new 3-R-(Z-cycloalkano)[d]thiazoline-2-ones, in which R, Z and the term cycloalkano have the above-given meaning, their salts or quaternary ammonium compounds exhibit analgesic properties and can be used as agents for the alleviation of pain. Thus, the new compounds may be used both in animals and humans to raise the threshold of pain, which is particularly of importance in the postoperative state; in animals, for example, after adrenalectomy connected with the studies of steroidal compounds influencing the functions of the adrenal glands; in humans postoperatively after minor or major surgery or also in the treatment of shock following accidental injuries, chronic pains such as headaches, or pains induced by arthritic diseases.

Especially valuable with respect to the analgesic activity are the 3-R-4-(tertiary amino-lower alkyl)-cycloalkano[d]thiazoline-2-ones, in which R stands for hydrogen or a lower alkyl radical, e.g. methyl, and in which the cycloalkano ring contains from 5 to 7 carbon atoms as ring members, or the acid addition salts thereof. This group of compounds may be represented, for example, by the 4-(N,N-lower alkylene-imino-methyl)-cyclohexano[d]thiazoline-2-ones, in which an N,N-lower alkylene-imino group stands for a pyrrolidino, a hexamethyleneimino or particularly for a piperidino group, or an addition salt with a hydrohalic acid thereof. The compounds of the formulae:

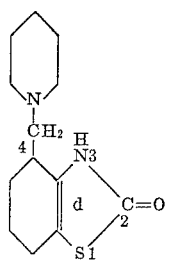

and

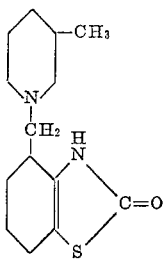

or the hydrohalides, e.g. hydrochlorides or hydrobromides, thereof, have been found to exhibit strong analgesic properties, which are coupled with a moderate, but desirable, quieting effect.

The compounds of this invention may be used as medicaments in the form of pharmaceutical preparations, which contain the new cycloalkano[d]thiazoline-2-ones, salts or quaternary ammonium derivatives thereof in admixture with a pharmaceutical organic or inorganic solid or liquid carrier suitable for enteral or parenteral administration. For making up the preparations there can be employed substances which do not react with the new compounds, such as water, gelatine, lactose, starches, magnesium stearate, talcum, vegetable oils, benzyl alcohols, gums, polyalkylene glycols or any other known carrier for medicaments. The pharmaceutical preparations may be, for example, in the form of tablets of dragees, or in liquid form as solutions, such as isotonic saline solutions, or suspensions or emulsions. If desired, they may contain auxiliary substances such as preserving agents, stabilizing agents, wetting or emulsifying agents, salts for varying the osmotic pressure or buffers. They may also contain, in combination, other therapeutically useful substances. The dose level, at which compounds of this invention may be used, will vary considerably depending upon the conditions to be treated, but the desirable dosage may be easily determined by the practicing physician. An effective and safe dose may have a range from about 1 mg. to about 500 mg., particularly from about 25 to about 200 mg. and a dose of about 50 mg. of the active ingredient is the preferred amount per dosage unit.

Although several processes for the preparation of the compounds of this invention may be devised from the general knowledge of the art, the new 3-R-(Z-cycloalkano)[d]thiazoline-2-ones, in which R and Z have the above-given meaning, and wherein the cycloalkano ring has the above-given dimensions, the salts or quaternary ammonium compounds thereof may be most conveniently prepared by treating a 2-halogeno-cycloalkanone, which contains the groups Z of the above-given meaning attached to one of the carbon atoms of the cycloalkanone ring, such ring having from 5 to 7 carbon atoms as ring members, and in which halogeno stands for a halogen atom, or an acid addition salt thereof, with a salt or an ester of an N-R-thiocarbamic acid, in which R has the above-given meaning, and, if desired, converting a resulting cycloalkano[d]thiazoline-2-one, which is unsubstituted in the 3-position, into a 3-hydrocarbon-cycloalkano-[d]thiazoline-2-one, and/or, if desired, resolving any resulting racemic compound into its antipodes, and/or, if desired, converting a resulting salt into its free base, and/or, if desired, converting any resulting free base into a salt or a quaternary ammonium compound thereof.

A halogen atom in the starting material is a chlorine, an iodine or particularly a bromine atom. Acid addition salts of the 2-halogeno-cycloalkanones used as the starting materials in the above reaction are especially the salts with hydrohalic acids, e.g. hydrochloric, hydrobromic or hydriodic acid. Salts of N-R-thiocarbamic acids are more particularly alkali metal, e.g. sodium or potassium, salts, or, preferably, the ammonium salt. Esters of such thiocarbamic acids are particularly lower alkyl esters, such as methyl, ethyl, propyl, isopropyl or butyl esters.

The reaction is carried out in the absence or in the presence of a diluent, such as an alkanol, e.g. methanol, ethanol or propanol, or an aqueous mixture of such solvents. It may be performed at room temperature or preferably at an elevated temperature ranging from about 50° to about 250°, at atmospheric pressure or in a closed vessel under pressure, and, if desired, in the presence of an inert gas, e.g. nitrogen. Under the specified conditions of the reaction a lower alkoxy group attached to the 2-position of an intermediarily formed cycloalkano-[d]thiazole is split off and the desired cycloalkano[d]-thiazoline-2-one is obtained directly.

A preferred feature of this process consists in treating a 2-halogeno-cycloalkanone, which contains a tertiary amino-lower alkyl group attached to the other carbon atom adjacent to the carbonyl group of the cycloalkanone ring, said ring having the above-given dimensions, and in which halogeno represents chlorine or bromine, or an addition salt with a hydrohalic acid thereof, with a lower alkyl ester of an N-R-thiocarbamic acid, in which R stands for hydrogen or a lower alkyl radical, to produce a 3-R-4-(tertiary amino-lower alkyl)-cycloalkano[d]thiazoline-2-one, in which R and the term cycloalkano have the above-given meaning, or an addition salt with a hydrohalic acid, e.g. hydrochloric or hydrobromic acid, thereof.

Particularly, the 4-(N,N-lower alkylene-imino-methyl)-cyclohexano[d]thiazoline-2-ones, in which an N,N-lower alkylene-imino group stands for a pyrrolidino, a piperidino or a hexamethyleneimino group, or the acid addition salts with hydrohalic acid, especially hydrobromic acid, thereof may be obtained by treating a 2-bromo-6-(N,N-lower alkylene-imino-methyl)-cyclohexanone, in which an N,N-lower alkylene-imino group has the aforementioned meaning, or an acid addition salt with a hydrohalic acid, e.g. hydrobromic acid, thereof, with a lower alkyl ester of thiocarbamic acid, in which lower alkyl stands for methyl, ethyl or propyl. For example, 2-bromo-6-[piperidino-(N)-methyl]-cyclohexanone hydrobromide or 2-bromo-6-[3-methyl-piperidino-(N)-methyl]-cyclohexanone hydrobromide yield upon reaction with ethyl thiocarbamate or ethyl N-methyl-thiocarbamate the 4-[piperidino-(N)-methyl]-cyclohexano[d]thiazoline-2-one and the 4-[3-methyl-piperidino-(N)-methyl]cyclohexano[d]thiazoline-2-one, respectively, or the corresponding 3-methyl-derivative.

A hydrogen atom attached to the nitrogen atom of the thiazoline-2-one ring in any resulting cycloalkano-[d]thiazoline-2-one may be replaced, for example, by converting a resulting cycloalkano[d]thiazoline-2-one or an acid addition salt thereof, into an alkali metal, e.g. lithium, sodium or potassium, salt by treatment with a reagent capable of forming an alkali metal salt and treating a thus-formed salt with a reactive ester of a hydroxylated hydrocarbon with a strong acid, for example, the halides, e.g. iodides, bromides or chlorides, of hydrocarbon radicals, e.g. those which are given as examples for the radical R in the general formula. Alkali metal salt forming reagents are preferably used in excess amounts and are particularly sodium or potassium dissolved in a lower alkanol, e.g. methanol, ethanol, propanol, isopropanol, butanol or isopentanol; a concentrated solution of sodium or potassium hydroxide in water or a lower alkanol, e.g. methanol or ethanol; or the amides or hydrides of lithium, sodium or potassium, which are preferably used in a hydrocarbon solvent, e.g. benzene, toluene or xylene, or in dioxane or the like.

Any functionally convertible group attached to a resulting 3-R-cycloalkano[d]thiazoline-2-one may be so converted. Thus, a free hydroxyl group may be converted into a lower alkoxy, e.g. methoxy or ethoxy, group or into an acyloxy, e.g. acetoxy, group by etherification or esterification, respectively; an esterified hydroxyl group may be converted into a free hydroxyl group by hydrolysis; or a nitro group may upon reduction be converted into an amino group.

Depending on the conditions used the cycloalkano-[d]thiazoline-2-ones of this invention may be obtained in the form of the free bases or the salts thereof. The salts may be converted into the free bases, for example, by reaction with an alkaline reagent, e.g. sodium or potassium hydroxide or aqueous ammonia. The free bases may be transformed into their therapeutically useful acid addition salts by reaction with the appropriate acids, such as those outlined hereinbefore. The preparation of the salts from the base may, for example, be carried out by treating a solution of the free base in an alcohol, e.g. methanol or ethanol, or an ether, e.g. diethyl ether, or a mixture of such solvents with the appropriate acid.

The quaternary ammonium compounds of the cycloalkano[d]thiazoline-2-ones of this invention may be obtained, for example, by reacting the tertiary bases with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic, or sulfuric acid. Such esters are specifically lower alkyl halides, e.g. methylchloride, methylbromide, methyliodide, ethylbromide or propylchloride; di-lower alkyl sulfates, e.g. dimethyl or diethyl sulfate; or lower alkyl aryl sulfonates, e.f. methyl p-toluene sulfonate. The quaternizing reactions, such as outlined above, are performed in the presence or absence of a solvent, at room temperature or at an elevated temperature or under cooling, at atmospheric pressure or in a closed vessel under pressure. Suitable solvents are more especially lower alkanols, e.g. methanol, ethanol, propanol, isopropanol, butanol, isobutanol or pentanol; ketones, e.g. acetone or methyl ethyl ketone; or organic acid amides, e.g. formamide or dimethylformamide.

Quaternary ammonium compounds obtained may be converted into the corresponding quaternary ammonium hydroxides, for example, by reaction of quaternary ammonium halides with silver oxide, or by reaction of the quaternary ammonium sulfates with barium hydroxide, or by treating the quaternary ammonium salts with an anion exchanger or by electrodialysis. From any resulting base there may be obtained therapeutically suitable quaternary ammonium salts by reaction with acids, for example, with those outlined hereinbefore for the definition of the acid addition salts; or by reaction with mono-lower alkyl sulfates such as methyl or ethyl sulfate. A quaternary ammonium compound obtained may also be converted directly into another quaternary ammonium compound without conversion into the quaternary ammonium hydroxide; for example, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

Ordinarily, the compounds are obtained in the form of their racemates which may be resolved into the optically active d- and l-forms according to procedures known for such a resolution. For example, the free base of a cycloalkano[d]thiazoline-2-one of this invention may be dissolved in a lower alkanol, e.g. methanol or ethanol, and the optically active form of an acid or a solution thereof is then added, whereupon a salt precipitates which is formed by the base and the optically active acid having identical direction of rotatory power. Especially useful as optically active forms of salt-forming acids are D- and L-tartaric acid; furthermore, the optically active forms of malic, mandelic, camphor sulfonic or quinic acid may be used. For example, if an ethanol solution of the racemic base 4-[piperidino-(N)-methyl]cycloalkano[d]thiazoline-2-one is treated with a solution of D-tartaric acid in ethanol, the salt formed by the d-base with the D-tartaric acid precipitates. On the other hand, if L-tartaric acid is used, the salt of the l-base with the L-tartaric acid is readily crystallized. Compounds containing, for example, two asymmetric carbon atoms, exist in two racemates, which may be separated, on the basis of their physicochemical differences, e.g. solubility, and the single racemates may then be resolved according to the above mentioned procedures, whereby four optically active forms may be obtained. According to the previously outlined procedure a salt with an optically active acid may be converted to the free, optically active base, which may form a salt with one of the acids used for the preparation of the acid addition salts.

The 2-halogeno-(Z)-cycloalkanones, which contain the group Z of the above-given meaning attached to one of the carbon atoms of the cycloalkanone ring, said ring having from 5 to 7 carbon atoms as ring members, and in which halogeno stands for a halogen atom, or an acid addition salt thereof, and which are used as the starting material in the above reaction, are new. Due to the asymmetric carbon atoms present, the racemic starting materials may be resolved into their antipodes and used as such; however, in the reaction with a thiocarbamic acid derivative, one of the asymmetric centers of the starting material is cancelled out and the resolution of a racemic compound into its antipodes is therefore recommended with the final products. Especially anticipated as intermediates are the 2-halogeno-cycloalkanones, which contain a tertiary amino-lower alkyl group attached to the other carbon atom adjacent to the carbonyl group of the cycloalkanone ring, which has the above-given dimensions, and in which halogeno represents chlorine or bromine, or the hydrohalic acid addition salts. Particularly, 2-bromo-6-(N,N-lower alkylene-imino-methyl)-cyclohexanones, in which the N,N-lower alkylene-imino group stands for a pyrrolidino, a hexamethyleneimino or primarily for a piperidino group or the hydrobromides are the preferred intermediates in the above described reaction. The new intermediates may be prepared by halogenation, e.g. chlorination or bromination, of the corresponding non-halogenated cycloalkanones or their acid addition salts, e.g. the hydrochloride or hydrobromide thereof. The halogen atom may be introduced by treatment of the appropriately substituted cycloalkanone or an acid addition salt thereof with molecular halogen, for example, by adding bromine to a solution of the cycloalkanone in glacial acetic acid, containing preferably from 10 to 50% of hydrogen bromide; or with a reactive N-halogeno-amide or imide, such as N-halogeno-succinimide, e.g. N-bromo- or N-chloro-succinimide; or N-halogeno-acetamide, e.g. N-chloro-acetamide, preferably used in an inert solvent, such as carbon tetrachloride or chloroform. An iodine atom may be introduced by treating the corresponding chlorine or bromine derivative with silver iodine in acetone.

The starting materials for the preparation of the above-mentioned halogeno-ketones, the cycloalkanones, which contain the group Z of the above-given meaning attached to one of the carbon atoms of the cycloalkanone ring, said ring having from 5 to 7 carbon atoms as ring members, or the acid addition salts thereof, are known or may be prepared according to processes described in the art for the preparation of analogous compounds. Especially useful as such cycloalkanones are those, which contain a tertiary amino-lower alkyl group attached to the other carbon atom adjacent to the carbonyl group of the cycloalkanone ring, which has the above-given dimensions. Particularly 2-(N,N-lower alkylene-imino-methyl)-cyclohexanones, in which the N,N-lower alkylene-imino group stands for a pyrrolidino, a hexamethyleneimino or primarily for a piperidino group, are the preferred starting materials in the preparation of the new intermediates.

A general method for the preparation of such cycloalkanones consists in treating a Grignard reagent, prepared from a halogeno-cycloalkanol, e.g. chlorocyclohexanol, with a tertiary amino-alkylhalide, such as a tertiary amino-ethylchloride, and subsequently oxidizing, for example, with chromic acid, the substituted cycloalkanol to the desired cycloalkanone. Cycloalkanones, in which the tertiary amino group is directly attached to a carbon atom of the cycloalkanone ring, may be preferably prepared by reacting a halogenocycloalkanone or a cycloalkanone with a secondary amine. Specific processes for the preparation of cycloalkanones, in which the alkylene radical of a tertiary amino alkyl group is attached to a carbon atom adjacent to the carbonyl group, may be, for example, the following methods: The cycloalkanones, which contain a tertiary amino-methyl group in the 2-position, may be prepared by reacting the cycloalkanone with a secondary amine in the presence of formaldehyde or a polymer thereof according to the Mannich procedure; or 2-(tertiary aminoalkyl)-cycloalkanones, in which alkyl stands for an alkylene radical containing more than one carbon atom, may be prepared, for example, by condensing a salt of a 2-carbalkoxy-cycloalkanone, such as, the sodium salt of a 2-carbethoxy-cycloalkanone, with a tertiary aminoalkyhalide, such as an N,N-di-lower alkyl-aminoethylchloride, and subsequently hydrolizing the ester in an alkaline medium, e.g. sodium hydroxide, and decarboxylating the resulting acid, for example, at an elevated temperature and/or in an acidic medium. The starting materials used for the preparation of the compounds of this invention may be obtained in the form of the free base or as salts. A free base may be converted into a salt, for example, by treatment with an acid, such as hydrohalic, e.g. hydrochloric or hydrobromic acid. A salt may be converted into the free base, for example, by treatment with an alkaline reagent, such as aqueous sodium hydroxide or aqueous ammonia.

This is a continuation-in-part application of my applications Serial No. 641,260, filed February 20, 1957, and now abandoned, and Serial No. 694,089, filed November 4, 1957, and now abandoned.

The following examples are intended to illustrate the invention. They are not to be construed as being limitations thereon. Temperatures are given in degrees centigrade.

*Example 1*

To a solution of 13.6 g. of 2-bromo-5-[piperidino-(N)-methyl]-cyclopentanone hydrobromide in 100 ml. of ethanol is added 5.2 g. of ethyl N-methyl-thiocarbamate and the mixture is refluxed for one hour. After filtration the solution is evaporated to dryness and the residue triturated with acetone. The crystalline 3-methyl-4-[piperidino-(N)-methyl]-cyclopentano[d]thiazoline-2-one hydrobromide is recrystallized from methanol, M.P. 252°, yield: 42 percent.

By dissolving the hydrobromide salt obtained in the above process in an aqueous solution of sodium hydroxide and extracting with ether, the 3-methyl-4-[piperidino-(N)-methyl]cyclopentano[d]thiazoline-2-one may be obtained. Upon treating an ethanolic solution of the free base with oxalic acid, the oxalate of 3-methyl-4-[piperidino-(N)-methyl]-cyclopentano[d]thiazoline-2-one may be obtained, which may be recrystallized from ethanol. Instead of using oxalic acid, d,l-tartaric acid may be employed, yielding the corresponding d,l-tartrate. Other acids which may be used in the formation of therapeutically useful acid addition salts are those especially mentioned hereinbefore.

The 2-bromo-5-[piperidino-(N)-methyl]-cyclopentanone hydrobromide used as the starting material may be prepared as follows: To 39.4 g. of 2-[piperidino-(N)-methyl]-cyclopentanone hydrobromide, dissolved in 400 ml. of a 50 percent solution of hydrogen bromide in glacial acetic acid, is added dropwise 24 g. of bromine at 0° while stirring. After 10 minutes of additional stirring an excess of ether is added and the crystals collected and washed with ether. 47 g. of 2-bromo-5-[piperidino-(N)-methyl]-cyclopentanone hydrobromide is obtained, M.P. 132–135°.

*Example 2*

To a solution of 13.6 g. of 2-bromo-5-[piperidino-(N)-methyl]-cyclopentanone hydrobromide in 100 ml. of ethanol is added 5.05 g. of ethyl thiocarbamate and the mixture is refluxed for one hour. After filtration the solution is evaporated to dryness and the residue triturated with acetone. The crystalline 4-[piperidino-(N)-methyl]-cyclopentano[d]thiazoline-2-one hydrobromide is collected and recrystallized from methanol, M.P. 228–229, yield: 11 percent.

*Example 3*

To a solution of 5.0 g. of crude 2-bromo-6-[morpholino-(N)-methyl]-cyclohexanone hydrobromide in 15 ml. of warm anhydrous ethanol is added 2.0 g. of ethyl thiocarbamate and the mixture is refluxed for two hours. After chilling, 3.3 g. of the white crystalline 4-[morpholino-(N)-methyl]-cyclohexano[d]thiazoline-2-one hydrobromide is collected by filtration and recrystallized from anhydrous ethanol, M.P. 211–213°.

The 2-bromo-6-[morpholino-(N)-methyl]-cyclohexanone hydrobromide used as the starting material may be prepared as follows: To a hot solution of 25.3 g. of 2-[morpholino-(N)-methyl]-cyclohexanone hydrobromide in 100 ml. of glacial acetic acid is added dropwise while stirring a solution of 15 g. of bromine in 13 ml. of glacial acetic acid. Chilling and addition of an excess of ether yields an oil, which is separated by decantation and, because trituration with anhydrous ether does not induce crystallization, is used without further purification.

*Example 4*

To 4.0 g. of 2-bromo-6-[pyrolidino-(N)-methyl]-cyclohexanone hydrobromide in 10 ml. of anhydrous ethanol is added 1.2 g. of ethyl thiocarbamate. The mixture is refluxed for two hours and then chilled. 2.1 g. of a white precipitate is formed and collected by filtration. After recrystallization from anhydrous ethanol the 4-[pyrrolidino-(N)-methyl]-cyclohexano[d]thiazoline-2-one hydrobromide melts at 234–236°.

The 2-bromo-6-[pyrrolidino-(N)-methyl]-cyclohexanone hydrobromide used as the starting material may be prepared as follows: A mixture of 49 g. of cyclohexanone, 9 g. of formaldehyde and 10.8 g. of pyrrolidine hydrochloride in a round bottom flask is heated slowly until an exothermic reaction occurs. At this point heating is discontinued and the reaction is allowed to cool to room temperature overnight. 50 ml. of water is added and after extraction with ether the aqueous solution is concentrated under reduced pressure. The resulting gummy material is dissolved in acetone and after chilling 20.2 g. of 2-[pyrrolidino-(N)-methyl]-cyclohexanone hydrochloride is collected by filtration, M.P. 128–130°. The latter is converted to the corresponding hydrobromide by dissolving in dilute sodium hydroxide, extracting with ether and adding dry hydrogen bromide to the ether solution; the hydrobromide melts at 158–160°. To a solution of 10.2 g. of this hydrobromide in 50 ml. of hot glacial acetic acid is added dropwise while stirring 6.4 g. of bromine in 5 ml. of glacial acetic acid. After chilling and addition of ether a light tan precipitate is formed; 7.9 g. of 2-bromo-6-[pyrrolidino-(N)-methyl]-cyclohexanone hydrobromide is collected by filtration, M.P. 153–155°.

*Example 5*

To a solution of 9 g. of 2-bromo-6-[piperidino-(N)-methyl]-cyclohexanone hydrobromide in 25 ml. of warm anhydrous ethanol is added 2.6 g. of ethyl thiocarbamate and the mixture is refluxed on a steam bath for two hours. Upon chilling a white crystalline product is formed, which is collected by filtration. 2.0 g. of 4-[piperidino-(N)-methyl]-cyclohexano[d]thiazoline-2-one hydrobromide is obtained after recrystallization from anhydrous ethanol, M.P. 223–225°.

By treating the resulting hydrobromide with aqueous ammonia, extracting the aqueous solution with ether and adding ethanolic hydrogen chloride to the ether solution, the corresponding hydrochloride salt may be obtained.

The 2-bromo-6-[piperidino-(N)-methyl]-cyclohexanone hydrobromide used as the starting material may be prepared as follows: 38.0 g. of 2-[piperidino-(N)-methyl]-cyclohexanone hydrobromide is dissolved in 100 ml. of hot glacial acetic acid and to this solution is added while stirring a solution of 23 g. of bromine in 20 ml. of glacial acetic acid. The mixture is allowed to cool to room temperature overnight. Addition of ether yields a gummy material which crystallizes after several triturations with ether and addition of acetone. 19.2 g. of the 2-bromo-6-[piperidino-(N)methyl]-cyclohexanone hydrobromide is obtained, M.P. 129–131°.

*Example 6*

To a solution of 9.9 g. 2-bromo-6-[piperidino-(N)-methyl]-cyclohexanone hydrobromide in 25 ml. of warm ethanol is added 2.8 g. of ethyl N-methyl-thiocarbamate and the mixture is refluxed on a steam bath for two hours. After chilling overnight, 3.2 g. of the resulting white crystals are collected by filtration. After recrystallization from anhydrous ethanol the 3-methyl-4-[piperidino-(N)-methyl]-cyclohexano[d]thiazoline-2-one hydrobromide melts at 231–233°.

*Example 7*

To 5 g. of 2-bromo-6-dimethylaminomethyl-cyclohexanone hydrobromide, dissolved in 25 ml. of warm anhydrous ethanol, is added 1.7 g. of ethyl thiocarbamate. The mixture if refluxed for two hours on a steam bath and then concentrated under reduced pressure to one half of its original volumes. After chilling 1.7 g. of a white precipitate is collected by filtration. After recrystallization from anhydrous ethanol the 4-dimethylamino-methyl-cyclohexano[d]thiazoline-2-one hydrobromide melts at 215–217°.

The 2-bromo-6-dimethylaminomethyl-cyclohexanone hydrobromide used as the starting material may be prepared by bromination of the 2-dimethylaminomethyl-cyclohexanone hydrobromide according to the procedure outlined in Example 3.

2.5 g. of 4-dimethylaminomethyl-cyclohexano[d]thiazoline-2-one hydrobromide is refluxed with a solution of 0.45 g. of sodium in 50 ml. of ethanol for 10 minutes. After addition of 1.4 g. of methyliodide, refluxing is continued for an additional 6 hours. The solvent is evaporated under reduced pressure, the residue dissolved in ether and the ether solution dried. An excess of a solution of dry hydrogen bromide in ether is added and the 3-methyl-4-dimethylaminomethyl - cyclohexano[d]thiazoline-2-one hydrobromide, which is identical with the product obtained according to Example 8, is recrystallized from ethanol.

By replacing methyl iodide by ethyl iodide or 2-dimethylaminoethylchloride, the 3-ethyl-4-dimethylaminomethyl-cyclohexano[d]thiazoline-2-one hydrobromide or the 3-(2-dimethylaminoethyl)-4-dimethylaminomethyl-cyclohexano[d]thiazoline-2-one dihydrobromide, respectively, may be obtained.

Instead of adding dry hydrogen bromide to the ether solution of the free base of 3-methyl-4-dimethylaminomethyl-cyclohexano[d]thiazoline-2-one, the latter may be dissolved in ethanol and treated with an excess of methyliodide, yielding the 3-methyl-4-dimethylaminomethyl-cyclohexano[d]thiazoline-2-one methiodide.

*Example 8*

To a solution of 5.0 g. of 2-bromo-6-dimethylaminomethyl-cyclohexanone hydrobromide in 25 ml. of warm anhydrous ethanol is added 2.2 g. of propyl N-methyl-thiocarbamate and the mixture is refluxed on a steam bath for two hours. Chilling of the solution induces precipitation of 1.4 g. of a white solid, which is collected by filtration. After recrystallization from anhydrous ethanol the 3-methyl-4-dimethylaminomethyl-cyclohexano[d]thiazoline-2-one hydrobromide melts at 236–238°.

*Example 9*

To a solution of 0.66 g. of 2-bromo-6-[piperidino-(N)-methyl]-cycloheptanone hydrobromide in 60 ml. of ethanol is added 0.23 g. of ethyl thiocarbamate and the mixture refluxed for one and one-half hours. The solvent is evaporated off and the resulting 4-[piperidino-(N)-methyl]-cycloheptano[d]thiazoline-2-one hydrobromide is recrystallized from ethanol, M.P. 248–252°.

The 2-bromo-6-[piperidino-(N)-methyl]-cycloheptanone hydrobromide used as the starting material may be prepared as follows: 5.4 g. of bromine is added dropwise at 0° to a solution of 9.9 g. of 2-[piperidino-(N)-methyl]-cycloheptanone hydrobromide in 200 ml. of a 50 percent solution of hydrogen bromide in glacial acetic acid. The solution is triturated with ether and the crude crystalline 2-bromo-7-[piperidino-(N)-methyl]-cycloheptanone hydrobromide is filtered off and used without further purification.

*Example 10*

A solution of 2.46 g. of 2-bromo-6-[4-phenyl-4-carbethoxy-piperidino-(N)-methyl]-cyclohexanone hydrobromide and 0.735 g. of ethyl thiocarbamate in 20 ml. of ethanol is refluxed for one and one half hours. The ethanol is then evaporated off, the residue triturated with acetone and the crystalline material filtered off. The 4-[4-phenyl-4-carbethoxy-piperidino -(N)- methyl] cyclohexano[d]thiazoline-2-one hydrobromide is recrystallized from ethanol, M.P. 239–241°, yield: 15 percent.

The 2-bromo-6-[4-phenyl-4-carbethoxy-piperidino-(N)-methyl]-cyclohexanone hydrobromide used as the starting material may be prepared as follows: A mixture of 14.7 g. of cyclohexanone, 2.7 g. of a 37 percent solution of formaldehyde and 8.0 g. of ethyl 4-phenyl-isonipecotate hydrochloride is heated for 15 minutes to 110–120°. After cooling 50 ml. of water is added, the solution is made basic with a 20 percent aqueous solution of potassium carbonate. The aqueous solution is extracted with ether, the ether solution washed with an aqueous sodium hydrogen carbonate solution and dried over sodium sulfate. After filtration, hydrogen bromide gas is added and the crystalline 2-[4-phenyl-4-carbethoxy-piperidino-(N)-methyl]-cyclohexanone hydrobromide, M.P. 176–178° is collected. 2.47 g. of the latter is dissolved in a 17 percent solution of hydrogen bromide in glacial acetic acid and 0.935 g. of bromine is added dropwise. The reaction mixture is triturated with ether and the crystalline 2-bromo-6-[4-phenyl-4-carbethoxy-piperidino-(N)-methyl]-cyclohexanone hydrobromide is filtered off, M.P. 183°.

*Example 11*

A mixture of 8.3 g. of 2-bromo-6-[morpholino-(N)-methyl]-cyclohexanone hydrobromide and 3.6 g. of ethyl N-methyl-thiocarbamate in 20 ml. ethanol is refluxed for 2 hours and worked up according to the procedure outlined in Example 3. After recrystallization from isopropanol, 4.6 g. of 3-methyl-4-[morpholine-(N)-methyl]-cyclohexano[d]thiazoline-2-one hydrobromide is obtained, M.P. 230–232°.

*Example 12*

A mixture of 3 g. of 2-bromo-6-[pyrrolidino-(N)-methyl]-cyclohexanone hydrobromide and 1.2 g. of ethyl N-methyl-thiocarbamate in 15 ml. of ethanol is refluxed for 2 hours and worked up according to the procedure outlined in Example 4. After recrystallization, 2 g. of 3 - methyl - 4 - [pyrrolidino - (N) - methyl] - cyclohexano[d]thiazoline-2-one hydrobromide is obtained, M.P. 242–244°.

By using the above-described general procedure and the appropriate starting materials, the following compounds may be prepared:

4-piperidino-(N)-cyclopentano[d]thiazoline-2-one hydrobromide

5 - [morpholino - (N) - methyl] - cyclopentano[d]thiazoline-2-one hydrobromide 5-piperidino-(N)-cyclopentano[d]thiazoline-2-one hydrobromide 5 - dimethylaminoethyl - cyclohexano[d]thiazoline - 2-one hydrobromide 3 - methyl - 5 - piperidino - (N) - cyclopentano[d]thiazoline-2-one hydrobromide 6 - [pyrrolidino - (N) - methyl] - cyclohexano[d]thiazoline-2-one hydrobromide 6 - [piperidino - (N) - methyl] - cyclopentano[d]thiazoline-2-one hydrobromide 3 - ethyl - 4 - [piperidino - (N) - ethyl] - cyclohexano-[d]thiazoline-2-one hydrobromide 4 - dimethylaminomethyl - cycloheptano[d]thiazoline-2-one hydrobromide.

*Example 13*

A mixture of 12 g. of 2-bromo-6-[4-methyl-piperazino-(1)-methyl]-cyclohexanone dihydrobromide and 3.1 g. of ethyl N-methyl-thiocarbamate in 25 ml. of ethanol is refluxed for 2 hours and cooled overnight. The resulting precipitate is filtered off, taken up in boiling isopropanol and filtered hot. The insoluble material is refluxed in ethanol for 2 hours and filtered off, yielding the 3-methyl - 4 - [4 - methyl - piperazino - (1) - methyl]-cyclohexano[d]thiazoline-2-one dihydrobromide, M.P. 226–228°, yield: 14 percent.

The starting material used in the above reaction may be prepared by bromination of the 2-[4-methyl-piperazino-(1)-methyl]-cyclohexanone dihydrobromide, M.P. 120–122°, according to the previously described procedure; the 2-bromo-6-[4-methyl-piperazino-(1)-methyl]-cyclohexanone dihydrobromide melts at 138–140°.

*Example 14*

A mixture of 12 g. of the 2-bromo-6-[4-methyl-piperazino-(1)-methyl]-cyclohexanone dihydrobromide and 2.7 g. of ethyl thiocarbamate in ethanol is treated as described in Example 13. The material, which is insoluble in boiling isopropanol, is repeatedly treated with boiling ethanol while stirring, yielding the 4-[4-methyl-piperazino-(1)-methyl]-cyclohexano[d]thiazoline-2-one dihydrobromide, M.P. 230–232°, yield: 28 percent.

Example 15

A mixture of 5 g. of 2-bromo-6-(2-dimethylaminoethyl)-cyclohexanone hydrobromide and 1.3 g. of ethyl thiocarbamate in 20 ml. of ethanol is refluxed on the steam bath for 3 hours and allowed to stand overnight at room temperature. The ethanol is partly evaporated, the precipitate filtered off and the filtrate allowed to stand, whereupon a second crop of crystals precipitates. The 4 - (2 - dimethylaminoethyl) - cyclohexano[d]thiazoline-2-one hydrobromide is recrystallized from isopropanol, M.P. 213–215°, yield: 12 percent.

The starting material used in the above reaction is obtained by bromination of the 2-(2-dimethylaminoethyl)-cyclohexanone hydrobromide according to the previously described procedure and is used without purification.

Example 16

A mixture of 10 g. of 2-bromo-6-dimethylamino-cyclohexanone hydrobromide and 3.5 g. of ethyl thiocarbamate in about 30 ml. of ethanol is heated on the steam bath for ½ hour. The ethanol is removed, the residue triturated with acetone and the solid material filtered off. The 4 - dimethylamino-cyclohexano[d]thiazoline-2-one hydrobromide is recrystallized from isopropanol, M.P. 207–209°, yield: 14 percent.

The bromo ketone hydrobromide used as the starting material in the above reaction may be obtained by bromination of the 2-dimethylamino-cyclohexanone hydrobromide according to the previously described procedure and is used without further purification.

Example 17

By reacting 10 g. of the 2-bromo-6-dimethylamino-cyclohexanone hydrobromide with 3.9 g. of ethyl N-methyl-thiocarbamate according to the procedure given in Example 16, the 3-methyl-4-dimethylamino-cyclohexano[d]thiazoline-2-one hydrobromide is obtained, M.P. 185–187°, yield: 15 percent.

Example 18

A mixture of 8.95 g. of 2-bromo-6-piperidino-(N)-cyclohexanone hydrobromide and 2.76 g. of ethyl thiocarbamate in 50 ml. of ethanol is refluxed for 3 hours and the ethanol then removed under reduced pressure. The residue is triturated once with acetone and several times with ether and the 4-piperidino-(N)-cyclohexano[d]thiazoline-2-one hydrobromide is recrystallized from ethanol, M.P. 224–226°, yield: 10 percent.

The starting material used in the above reaction may be prepared as follows: A mixture of 66.3 g. of 2-chloro-cyclohexanone and 85.15 g. of piperidine in 300 ml. of anhydrous ethanol is refluxed for 4 hours and the ethanol removed. The residue is made acidic with a 3 N aqueous solution of hydrogen chloride, the aqueous solution extracted with ether and then made alkaline with a 5% aqueous solution of sodium hydroxide. The alkaline solution is extracted with ether, the ether solution dried over sodium sulfate and hydrogen bromide gas bubbled into the solution. The hydrobromide of 2-piperidino-(N)-cyclohexanone, melting at 140–150°, is brominated according to the previously given procedure and the bromo ketone hydrobromide used without further purification.

Example 19

A mixture of 11.9 g. of 2-bromo-6-morpholino-(N)-cyclohexanone hydrobromide and 4.74 g. of ethyl thiocarbamate in about 30 ml. of ethanol is heated on the steam bath for 3 hours and the ethanol partially evaporated. The resulting crystals are filtered off and triturated with anhydrous ethanol. The insoluble material is dried, yielding the 4-morpholino-(N)-cyclohexano[d]thiazoline-2-one hydrobromide, M.P. 202–204°, yield: 12 percent.

The starting material used in the above reaction may be prepared by reacting 2-chloro-cyclohexanone with morpholine according to the procedure given in Example 18 and the hydrobromide of 2-morpholino-(N)-cyclohexanone is brominated according to the previously given method and used without further purification.

Example 20

By reacting 11.9 g. of 2-bromo-6-morpholino-(N)-cyclohexanone hydrobromide and 5.31 g. of ethyl N-methylthiocarbamate according to the procedure given in Example 19, the 3-methyl-4-morpholino-(N)-cyclohexano[d]thiazoline-2-one hydrobromide is obtained, M.P. 178–180°, yield: 1.5 percent.

Example 21

A mixture of 19.9 g. of 2-bromo-6-piperidino-(N)-cyclohexanone hydrobromide and 6.9 g. of ethyl N-methylthiocarbamate in about 75 ml. of anhydrous ethanol is treated according to the procedure described in Example 18. The 3 - methyl - 4 - piperidino-(N)-cyclohexano[d]thiazoline-2-one hydrobromide is insoluble in isopropanol and melts at 178–182°, yield: 5 percent.

Example 22

A mixture of 4.0 g. of 2 - bromo - 5 - piperidino-(N)-cyclohexanone hydrobromide and 1.79 g. of ethyl thiocarbamate is heated on the steam bath for 3 hours and the mixture then cooled. After several triturations with ether, the reaction product becomes solid, is taken up in isopropanol, filtered, and the filtrate evaporated to dryness. 2 g. of the crude 5-piperidino-(N)-cyclohexano-[d]thiazoline-2-one hydrobromide is recrystallized from a small amount of isopropanol, M.P. 207–209°.

The starting material used in the above reaction may be prepared as follows: 20 g. of 2-cyclohexenone is added dropwise to 19.5 g. of piperidine while cooling and stirring, and the reaction mixture is allowed to stand at room temperature overnight. After refluxing for one hour, the reaction product is taken up in 3 N aqueous hydrogen chloride, extracted with ether, and the acid solution made alkaline with a 5% aqueous solution of sodium hydroxide. The alkaline solution is extracted with ether, the ether solution dried over sodium sulfate and hydrogen bromide gas bubbled through the dry solution. A gummy material forms, the supernatant ether is decanted and the residue is taken up in isopropanol. The 3-piperidino-(N)-cyclohexanone hydrobromide precipitates and is filtered off, M.P. 158–160°. The 2-bromo - 5 - piperidino-(N)-cyclohexanone hydrobromide may be obtained by bromination of the resulting 3-piperidino-(N)-cyclohexanone hydrobromide according to the previously given method, M.P. 178–180°.

Example 23

To a solution of 3.7 g. of 2-bromo-6-[hexamethylene-imino-(N)-methyl]-cyclohexanone hydrobromide in 30 ml. of ethanol is added 1.2 g. of ethyl thiocarbamate and the reaction mixture refluxed for 3 hours and chilled. The resulting 4 - [hexamethylene-imino - (N) - methyl]-cyclohexano[d]thiazoline-2-one hydrobromide is filtered off and recrystallized from methanol, M.P. 232–234°, yield: 55 percent.

The starting material used in the above reaction may be prepared by bromination of the 2-[hexamethylene-imino-(N)-methyl]-cyclohexanone hydrobromide according to the previously given method and melts at 153–155°.

Example 24

A mixture of 3.69 g. of 2-bromo-6-[hexamethylene-imino - (N) - methyl]-cyclohexanone hydrobromide and 1.43 g. of ethyl N-methyl thiocarbamate in 30 ml. of anhydrous ethanol is refluxed for 3 hours and the ethanol removed under reduced pressure. The residue is taken up in acetone and the 3-methyl-4-[hexamethyleneimino-(N)-methyl]-cyclohexano[d]thiazoline-2-one hydrobromide is filtered off and recrystallized from methanol, M.P. 220–222°, yield: 33 percent.

Example 25

0.05 mole of 2-bromo-6-[2-methyl-piperidino-(N)-methyl]-cyclohexanone hydrobromide is treated with 3 g. of ethyl thiocarbamate in a small amount of acetone and the mixture is heated on the steam bath until the acetone is evaporated off. The residue is heated for 2 additional hours on the steam bath and then taken up in warm acetone, quickly filtered, the warm filtrate refiltered and the filtrate refrigerated. The 4-[2-methyl-piperidino - (N) - methyl] - cyclohexano[d]thiazoline-2-one hydrobromide crystallizes and is recrystallized from methanol, M.P. 227–229°, yield: 34 percent.

The starting material is prepared by bromination of the 2 - [2-methyl-piperidino-(N)-methyl]-cyclohexanone hydrobromide according to the previously given method and is used without further purification.

Example 26

A mixture of 0.0733 mole of 2-bromo-4-benzoyloxy-6-[piperidino - (N) - methyl]-cyclohexanone hydrobromide and 0.0733 mole of ethyl thiocarbamate in 125 ml. of ethanol is refluxed for 2 hours and the ethanol then removed under reduced pressure. The residue is taken up in acetone and the resulting ammonium bromide is filtered off. The filtrate is evaporated to dryness and upon addition of ethanol, 8 g. of the 4-[piperidino-(N)-methyl]-6-benzoyloxy - cyclohexano[d]thiazoline - 2 - one hydrobromide crystallizes and is recrystallized from a 1:1-mixture of methanol and ethanol, M.P. 248–249°.

The starting material used in the reaction may be prepared as follows: 54.5 g. of 4-benzoyloxy-cyclohexanone is treated with a mixture of 9 ml. of a 38% aqueous solution of formaldehyde and 12 g. of piperidine hydrochloride and heated to vigorous reflux. The heat is removed as the exothermic reaction sustains itself. A thick fluid is formed, water is added after cooling to room temperature and the aqueous solution extracted with ether. The aqueous solution is made alkaline with a 50% aqueous solution of sodium hydroxide and the alkaline solution extracted three times with ether. The ether solution is washed with a saturated aqueous solution of sodium hydrogen carbonate, dried over potassium carbonate and hydrogen bromide gas added. The 2-[piperidino-(N)-methyl]-4-benzoyloxy-cyclohexanone hydrobromide melts at 138–140°. Bromination of this product to the 2-bromo-4-benzoyloxy-6-[piperidino - (N) - methyl]-cyclohexanone hydrobromide is carried out according to the previously given procedure and the very hygroscopic product is used without further purification.

Example 27

1 g. of 4-[piperidino-(N)-methyl]-cyclohexano[d]thiazoline-2-one is dissolved in 20 ml. of acetone, 2 g. of methyliodide is added and the solution allowed to stand at room temperature for one week. The methiodide of 4-[piperidino - (N)- methyl]-cyclohexano[d]thiazoline-2-one is collected by filtration and washed with acetone, M.P. 228–230°, yield: about 100 percent.

Example 28

A mixture of 4.73 g. of 2-bromo-6-[N-pyridino-(3)-methyl - N - methyl-amino-methyl]-cyclohexanone dihydrobromide and 1.26 g. of ethyl thiocarbamate in 40 ml. of anhydrous ethanol is refluxed for 2 hours. Upon cooling the 4 - [N - pyridino - (3) - methyl-N-methyl-aminomethyl] - cyclohexano[d]thiazoline-2-one dihydrobromide crystallizes, M.P. 140°, yield: 10 percent.

The starting material used in the above reaction, prepared by the Mannich reaction of cyclohexanone with N-pyridino-(3)-methyl-N-methyl-amine in the presence of formaldehyde and subsequent bromination according to the previously given method, is a very hygroscopic substance and is used without further purification.

Example 29

1.5 g. of 4-[piperidino-(N)-methyl]-6-benzoyloxy-cyclohexano[d]thiazoline-2-one hydrobromide, prepared according to the procedure given in Example 26, is dissolved in water and the aqueous solution made alkaline with aqueous ammonia and the crystalline material, representing the free base, is filtered off. The latter is dissolved in a 20% aqueous solution of hydrogen chloride and is refluxed for 3 hours. After evaporation to dryness, the residue is taken up in ethanol, the solution filtered, the solvent removed from the filtrate under reduced pressure and the resulting oil taken up in acetone. 0.1 g. of the 4-[piperidino-(N)-methyl]-6-hydroxy-cyclohexano[d]thiazoline-2-one hydrochloride crystallizes and is recrystallized from methanol, M.P. 214–216°.

Example 30

A mixture of 5 g. of 2-bromo-6-[4-methyl-piperidino-(N)-methyl]-cyclohexanone hydrobromide and 1.46 g. of ethyl thiocarbamate in 50 ml. of ethanol is refluxed for 2 hours and the ethanol evaporated to dryness. The residue is taken up in acetone and the 4-[4-methyl-piperidino-(N)-methyl] - cyclohexano[d]thiazoline-2-one hydrobromide crystallizes and is recrystallized from a 1:1-mixture of ethanol and ether, M.P. 248°, yield: 30 percent.

The starting material used in the above reaction may be obtained by bromination of the 2-[4-methyl-piperidino-(N)-methyl]-cyclohexanone hydrobromide, M.P. 200–203°, according to the previously given method and in view of its very hygroscopic consistency is used without further purification.

Example 31

By reacting 3.0 g. of 2-bromo-6-[4-methyl-piperidino-(N)-methyl]-cyclohexanone hydrobromide with 1.19 g. of ethyl N-methyl-thiocarbamate according to the procedure given in Example 30, the 3-methyl-4-[4-methyl-piperidino-(N)-methyl] - cyclohexano[d]thiazoline-2-one hydrobromide is obtained and melts after recrystallization from a mixture of methanol and ethanol at 255°, yield: 35 percent.

Example 32

A mixture of 3.69 g. of 2-bromo-6-[3-methyl-piperidino-(N)-methyl]-cyclohexanone hydrobromide and 1.05 g. of ethyl thiocarbamate in 40 ml. of ethanol is refluxed for 2 hours and the ethanol removed under reduced pressure. The residue is triturated with ethanol and the 4-[3-methyl piperidino - (N) - methyl]-cyclohexano[d]thiazoline -2- one hydrobromide is obtained in pure form, M.P. 242°, yield: 37 percent.

The starting material is obtained by bromination of the 2-[3-methyl - piperidino-(N)-methyl]-cyclohexanone hydrobromide, M.P. 185°, according to the previously given procedure and because of its oily character is used without further purification.

Example 33

A mixture of 15 g. of 2-bromo-6-[4-(2-dimethylaminoethyl) - piperidino - (N) - methyl] - cyclohexanone dihydrobromide and 3.67 g. of ethyl thiocarbamate in 100 ml. of ethanol is refluxed for 5 hours and the cold reaction mixture filtered. The ethanol is evaporated under reduced pressure and the remaining oil taken up in acetone. The 4 - [4 - (2 - dimethylaminoethyl) - piperidino - (N)-methyl]-cyclohexano[d]thiazoline-2-one dihydrobromide crystallizes, is filtered off and recrystallized from a 1:1-mixture of ethanol and methanol, M.P. 224–226°, yield: 12 percent.

The starting material, obtained by bromination of the 2 - [4 - (2 - dimethylaminoethyl) - piperidino - (N)-methyl]-cyclohexanone dihydrobromide according to the previously given procedure, is very hygroscopic and is used without further purification.

Example 34

A mixture of 8 g. of 2-bromo-6-[4-(2-hydroxyethyl)-piperazino-(1)-methyl]-cyclohexanone dihydrobromide and 2.6 g. of ethyl thiocarbamate in 50 ml. of ethanol is refluxed for two hours, the ethanol removed under reduced pressure and the remaining oil dissolved in water. The aqueous solution is made basic with aqueous ammonia and the free base extracted with ether. The ether solution is dried over sodium sulfate, gassed with hydrogen bromide and the 4-[4-(2-hydroxyethyl)-piperazino-(1) - methyl] - cyclohexano[d]thiazoline - 2 - one dihydrobromide is obtained, M.P. 205–208°, yield: 5.5 percent.

Example 35

0.028 mole of 2-bromo-6-[3-hydroxy-piperidino-(N)-methyl]-cyclohexanone hydrobromide in 100 ml. of ethanol is treated with 0.02 mole of ethyl thiocarbamate, and the reaction mixture is refluxed for 2 hours and then allowed to stand overnight at room temperature. The solvent is evaporated under reduced pressure, the residue taken up into acetone and upon addition of ether, the 4 - [3 - hydroxy - piperidino - (N) - methyl] - cyclohexano[d]thiazoline-2-one hydrobromide crystallizes, is filtered off and recrystallized from ethanol, M.P. 247°, yield: 42 percent.

The starting material is obtained by bromination of 2 - [3 - hydroxy - piperidino - (N) - methyl] - cyclohexanone hydrobromide, M.P. 160–170°, according to the previously given procedure, and is used because of its oily consistency without further purification.

Example 36

By reacting 3.7 g. of 2-bromo-6-[3-hydroxy-piperidino-(N)-methyl]-cyclohexanone hydrobromide with 1.3 g. of ethyl N-methyl-thiocarbamate according to the method given in Example 35, the 3-methyl-4-[3-hydroxy-piperidino - (N) - methyl] - cyclohexano[d]thiazoline - 2 - one hydrobromide is obtained and is recrystallized from a mixture of ethanol and methanol, M.P. 240–242°, yield 18 percent.

Example 37

By treating 25 g. of 2-bromo-6-[3-methyl-piperidino-(N)-methyl]-cyclohexanone hydrobromide with 8.1 g. of ethyl N-methyl-thiocarbamate according to the procedure given in Example 32, the 3-methyl-4-[3-methyl-piperidino - (N) - methyl] - cyclohexano[d]thiazoline - 2 - one hydrobromide is obtained and is recrystallized from ethanol, M.P. 235–237°, yield: 30 percent.

Example 38

3.49 g. of the 4-[3-hydroxy-piperidino-(N)-methyl]-cyclohexano[d]thiazoline-2-one hydrobromide, prepared according to the procedure given in Example 35, is refluxed in 35 ml. of acetic acid anhydride for 2 hours and the reaction mixture is poured on ice. The aqueous mixture is made basic with an aqueous solution of sodium hydroxide to pH 9, whereupon a gummy and an oily material is obtained. The aqueous solution is decanted and the residue crystallizes upon standing for 3 days. The 4 - [3 - acetoxy - piperidino - (N) - methyl] - cyclohexano[d]thiazoline-2-one melts at 133–135°, yield: 5 percent.

Example 39

A solution of 25 g. of 2-bromo-6-[2-methyl-5-ethyl-piperidino-(N)-methyl]cyclohexanone hydrobromide in 130 ml. of ethanol is treated with 6.6 g. of ethyl thiocarbamate and refluxed for 2 hours. The mixture is chilled, filtered and the filtrate evaporated to dryness. The residue is taken up in acetone, filtered and the mother liquor allowed to stand in the cold. The crystalline 4-[2-methyl-5 - ethyl - piperidino - (N) - methyl] - cyclohexano[d]thiazoline-2-one hydrobromide is obtained in crystalline form and recrystallized from ethanol, M.P. 225–230°, yield: 20 percent.

The starting material used in the above reaction may be prepared by treating cyclohexanone with 2-methyl-5-ethyl-piperidine in the presence of formaldehyde and subsequent bromination of the resulting Mannich reaction product.

Example 40

To a solution of 0.88 g. of 4-[3-hydroxy-piperidino-(N) - methyl] - cyclohexano[d]thiazoline - 2 - one, prepared from the hydrobromide described in Example 35 by treatment with aqueous ammonia, in 25 ml. of toluene is added 0.159 g. of sodium hydride and the mixture refluxed for 6 hours. 0.940 g. of methyl iodide is added dropwise and refluxing continued for an additional 18 hours. The mixture is filtered, the filtrate evaporated to dryness and the oily residue taken up in ether, which solution is dried over sodium sulfate and gassed with hydrogen bromide. The 3-methyl-4-[3-methoxy-piperidino - (N) - methyl] - cyclohexano[d]thiazoline - 2 - one hydrobromide is collected, M.P. 235–236°, yield: 32 percent.

Example 41

2.86 g. of the racemic d,l-4-[piperidino-(N)-methyl]-cyclohexano[d]thiazoline-2-one, prepared by treating the hydrobromide salt described in Example 5 with an aqueous solution of sodium hydroxide, subsequent extraction with ether and isolation from the ether solution, is dissolved in 29 ml. of acetone, to which solution is added 1.7 g. of D-tartaric acid. A gummy material precipitates immediately, which changes to a white powder on addition of an additional amount of 50 ml. of acetone. 3.18 g. of this powder is filtered off, dissolved in 100 ml. of ethanol and allowed to stand over a period of about 60 hours. The acetone filtrate is also kept for the same period of time. A few crystals are formed in the acetone filtrate, which are collected and used to seed the ethanol solution, which is then allowed to stand for one additional day. 1.48 g. of crystalline material, melting at 172–173°, is collected and determined as the D-tartrate of the racemic d,l-4-[piperidino - (N) - methyl]-cyclohexano[d]thiazoline-2-one. The mother liquor is allowed to stand overnight and the D-tartrate of the optically active d - 4 - [piperidino - (N) - methyl]-cyclohexano[d]thiazoline-2-one is filtered off and recrystallized from methanol, M.P. 160°, $[\alpha]_D^{25°} = +14.0 \pm 0$.

Example 42

3.0 g. of 4-[piperidino-(N)-methyl]-cyclohexano[d]thiazoline-2-one is dissolved in 30 ml. of ethanol and 1.78 g. of L-tartaric acid in 35 ml. of ethanol is added. The mixture is allowed to stand at room temperature for about 60 hours and 2.75 g. of the crystalline L-tartrate of the optically active l-4-[piperidino-(N)-methyl]-cyclohexano[d]thiazoline-2-one is collected and recrystallized from methanol, M.P. 168°, $[\alpha]_D^{25°} = -19.0 \pm 1$. From the mother liquor, which is allowed to stand overnight, a second crop of crystals, representing the L-tartrate of the racemic d,l-4-[piperidino-(N)-methyl]-cyclohexano-[d]thiazoline-2-one can be collected, M.P. 128–130°.

Example 43

0.01 mole of 2-thiocyano-6-[piperidino-(N)-methyl]-cyclohexanone is refluxed in a 2 N aqueous solution of hydrochloric acid for 48 hours. The reaction mixture is made alkaline with aqueous sodium hydroxide solution, extracted with ether and the ether solution dried over sodium sulfate. Hydrobromic acid gas is bubbled through the ether solution and the 4-[piperidino-(N)-methyl]-cyclohexano[d]thiazoline-2-one hydrobromide is obtained, which is identical with the compound obtained according to Example 5.

The starting material used in the above reaction may be prepared by treating an ethanol solution of 2-bromo-6-[piperidino-(N)-methyl]-cyclohexanone with an equivalent amount of barium thiocyanate at room temperature while stirring for 48 hours, filtering off the barium chloride formed, adding an equivalent amount of water, extracting with ether and drying the ether solution over potassium carbonate. After removal of the organic solvent the 2-thiocyano-6-[piperidino-(N)-methyl]-cyclohexanone is used without further purification.

*Example 44*

A mixture of 2.65 g. 2-bromo-6-[3-ethyl-piperidino-(N)-methyl]-cyclohexanone hydrobromide and 0.73 g. of ethyl thiocarbamate in 25 ml. of ethanol is refluxed for three hours and the ethanol then removed. The residue crystallizes upon chilling and the 4-[3-ethyl-piperidino-(N)-methyl]-cyclohexano[d]thiazoline-2-one hydrobromide is recrystallized from ethanol, M.P. 224–226°, yield: 1 g.

The starting material used in the above reaction may be prepared by treating cyclohexanone with 3-ethyl-piperidine hydrobromide in the presence of formaldehyde, and brominating the resulting 2-[3-ethyl-piperidino-(N)-methyl]-cyclohexanone hydrobromide, M.P. 134–138°, to form the 2-bromo-6-[3-ethyl-piperidino-(N)-methyl]-cyclohexanone hydrobromide, M.P. 160°.

*Example 45*

A mixture of 0.0175 mole of 2-bromo-6-[2,4-dimethyl-piperidino-(N)-methyl]-cyclohexanone hydrobromide and 1.84 g. of ethyl thiocarbamate in 30 ml. of ethanol is refluxed for four hours, the ethanol is removed and the crystalline 4-[2,4-dimethyl-piperidino-(N)-methyl]-cyclohexano[d]thiazoline-2-one hydrobromide is recrystallized from ethanol, M.P. 239–241°, yield: 50 percent.

The starting material may be prepared according to the previously described procedure; the 2[2,4-dimethyl-piperidino-(N)-methyl]-cyclohexanone hydrobromide melts at 144–148°, whereas the hydrobromide of 2-bromo-6-[2,4-dimethyl-piperidino-(N)-methyl]-cyclohexanone is used without purification.

*Example 46*

A solution of 0.0306 mole of 2-bromo-6-[3-(1-hydroxy-ethyl)-piperidino-(N)-methyl]-cyclohexanone hydrobromide and 3.3 g. of ethyl thiocarbamate in 50 ml. of ethanol is refluxed for 3½ hours, the solvent evaporated and acetone added to the residue. After filtering and standing at 5° the 4-[3-(1-hydroxy-ethyl)-piperidino-(N)-methyl]-cyclohexano[d]thiazoline-2-one hydrobromide is collected and recrystallized from ethanol, M.P. 188–189°, yield: 10 percent.

The starting material used in the above reaction may be prepared according to the known procedure and because of its oily nature is used without further purification.

*Example 47*

A solution of 5 g. of 2-bromo-6-[3,5-dimethyl-piperidino-(N)-methyl]-cyclohexanone hydrobromide and 1.44 g. of ethyl thiocarbamate in 25 ml. of ethanol is refluxed for three hours, then chilled and the crystalline material collected. The 4-[3,5-dimethyl-piperidino-(N)-methyl]-cyclohexano[d]thiazoline-2-one hydrobromide is recrystallized from ethanol, M.P. 238–240°, yield: 25 percent.

The starting material may be prepared from 2-[3,5-dimethyl-piperidino-(N)-methyl]-cyclohexanone hydrobromide, M.P. 157–158°, by bromination and is used without further purification.

*Example 48*

A mixture of 3.43 g. of 2-bromo-5-[morpholino-(N)-methyl]-cyclopentanone hydrobromide and 2.1 g. of ethyl thiocarbamate is heated two hours and then taken up in acetone. An oil separates, which crystallizes; the crystals are filtered off and the 4-[morpholino-(N)-methyl]-cyclopentano[d]thiazoline-2-one hydrobromide is recrystallized from methanol, M.P. 199–201°, yield: 10 percent.

The 2-bromo-5-[morpholino-(N)-methyl]-cyclopentanone hydrobromide used as the starting material may be prepared by bromination of the 2-[morpholino-(N)-methyl]-cyclopentanone hydrobromide according to the previously given procedure and, because of its oily consistency, is used without further purification.

*Example 49*

A solution of 11.7 g. of 2-bromo-6-[3-hydroxymethyl-piperidino-(N)-methyl]-cyclohexanone hydrobromide and 3.26 g. of ethyl thiocarbamate in 100 ml. of ethanol is refluxed for three hours and the ethanol then stripped off to about one fourth of the original volume. The residual ethanol solution is chilled and an excess of acetone is added. The crystalline material is collected and the 4[3-hydroxymethyl-piperidino-(N)-methyl]-cyclohexano[d]thiazoline-2-one hydrobromide is recrystallized from ethanol, M.P. 230–232°, yield: 33 percent.

The 2-bromo-6-[3-hydroxymethyl-piperidino-(N)-methyl]-cyclohexanone hydrobromide used as the starting material, prepared according to the previously described procedure, is an oil and is used without further purification.

*Example 50*

By treating the 4-[3-hydroxymethyl-piperidino-(N)-methyl]cyclohexano[d]thiazoline-2-one hydrobromide, prepared according to the procedure given in Example 49, with an excess of acetic acid anhydride according to the procedure given in Example 38, the 4-[3-acetoxymethyl-piperidino-(N)-methyl]-cyclohexano[d]thiazoline-2-one is obtained in a low yield.

Instead of using acetic acid anhydride, the 4-[3-hydroxymethyl-piperidino-(N)-methyl]-cyclohexano[d]thiazoline-2-one hydrobromide may be treated with phosgene and ammonia to yield the 4-[3-carbamyloxy-piperidino-(N)-methyl]-cyclohexano[d]thiazoline-2-one.

*Example 51*

A solution of 2-bromo-6-[4-hydroxymethyl-piperidino-(N)-methyl]-cyclohexanone hydrobromide and ethyl thiocarbamate in ethanol is refluxed for three hours and worked up according to the procedure described in Example 49 to yield the 4-[4-hydroxymethyl-piperidino-(N)-methyl]-cyclohexano[d]thiazoline-2-one hydro bromide.

*Example 52*

By treating a toluene solution of 4-[3-hydroxymethyl-piperidino-(N)-methyl]-cyclohexano[d]thiazoline-2-one hydrobromide, prepared from the corresponding hydrobromide salt obtained according to the procedure given in Example 49, with sodium hydride and then with an excess of methyl iodide according to the method given in Example 40, the 3-methyl-4-[3-methoxy-methyl-piperidino-(N)-methyl]-cyclohexano[d]thiazoline-2-one hydrobromide may be obtained.

*Example 53*

A mixture of 19.2 g. of 2-bromo-6-[2,3-dimethyl-piperidino-(N)-methyl]-cyclohexanone hydrobromide and 5.45 g. of ethyl thiocarbamate in 50 ml. of ethanol is refluxed for four hours and the solution evaporated to half of the original amount. Upon chilling the 4-[2,3-dimethyl-piperidino-(N)-methyl]-cyclohexano[d]thiazoline-2-one hydrobromide crystallizes and is recrystallized from ethanol, M.P. 225–227°, yield: 2 g.

The oily 2-bromo-6-[2,3-dimethyl-piperidino-(N)-methyl]-cyclohexanone hydrobromide used as the starting material may be prepared according to the general procedure given hereinbefore and is used without further purification.

Example 54

A mixture of 7.0 g. of 2-bromo-5-[hexamethyleneimino-(N)-methyl]-cyclopentanone hydrobromide and 5 g. of ethyl thiocarbamate is heated for one-half hour to 100°, an excess of acetone is added and the mixture allowed to stand overnight. The crystalline material is collected and the 4-[hexamethyleneimino-(N)-methyl]-cyclopentano[d]thiazoline-2-one hydrobromide is recrystallized three times from a mixture of ethanol and methanol, M.P. 189–190°, yield: 5 percent.

The 2 - bromo-5-[hexamethyleneimino - (N)-methyl]-cyclopentanone hydrobromide used as the starting material may be prepared by brominating the 2-[hexamethyleneimino-(N)-methyl]-cyclopentanone hydrobromide according to the previously given procedure and is used without further purification.

Example 55

A mixture of 1 g. of 2-bromo-6-[4-phenyl-4-carbethoxy - piperidino - (N) - methyl]-cyclohexanone hydrobromide and 0.3 g. of ethyl N-methyl-thiocarbamate in 10 ml. of ethanol is refluxed for one hour, chilled and filtered. The 4-[4 - phenyl - 4 - carbethoxy-piperidino-(N)-methyl] - cyclohexano[d]thiazoline-2-one hydrobromide melts after recrystallization from ethanol at 229–231°, yield: 0.5 g.

Example 56

The new cyclohexano[d]thiazoline-2-one compounds of this invention may be formulated into pharmaceutical preparations. Thus, the 4-[piperidino-(N)-methyl]-cyclohexano[d]thiazoline-2-one hydrobromide may be made up into tablets, each containing 0.050 g. of the active ingredients (procedure for 1.500 tablets).

Ingredients:                                              G.
4 - [piperidino-(N)-methyl-]-cyclohexano
  [d]thiazoline-2-one hydrobromide _____   75.000
Tragancanth gum, powdered _____     6.000
Lactose _____  188.800
Alcohol 3A, 50% (a sufficient quantity)__
Talcum _____   15.000
Corn starch _____   15.000
Magnesium stearate _____    1.500
Alginic acid _____   13.700

A mixture of the lactose, the tragacanth and the 4-[piperidino - (N) - methyl]-cyclohexano[d]thiazoline-2-one hydrobromide is granluated with a sufficient amount of alcohol and the wet granulation is passed through a No. 8 mesh screen and dried. After grinding through a No. 16 screen and adding the talcum, corn starch, magnesium stearate and alginic acid tablets of 0.210 g. using $^{10}\!/_{32}''$ standard concave punches are compressed.

The process for the preparation of 3-R-(Z-cycloalkano[d]thiazoline-2-ones, in which R stands for hydrogen or a hydrocarbon radical and the group Z stands for a tertiary amino or a tertiary amino-lower alkyl group attached to one of the carbon atoms of the cycloalkano ring and wherein cycloalkano stands for a cycloalkane ring which contains from 5 to 7 carbon atoms as ring members and is condensed to the d-bond of the thiazoline-2-one ring, the salts or quaternary ammonium compounds thereof as described hereinbefore, is an especially useful example of the general process for the preparation of the compounds of this invention, which consists in reacting together compounds of the formulae:

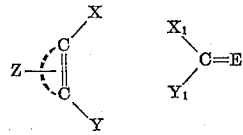

or the tautomeric forms and/or the salts of such compounds, wherein Z has the above-given meaning and is attached to one of the available carbon atoms of the cycloalkano ring, which contains, as mentioned before, from 5 to 7 carbon atoms as ring member and is connected to the d-bond of the thiazoline ring, E stands for an oxo group or a group which is convertible into the oxo group, such as, for example, an etherified hydroxyl group, and in which X and $X_1$ represent substituents reacting together with the formation of the group:

wherein R has the meaning given above, and Y and $Y_1$ stand for substituents reacting together with the formation of the group: —S— and, if desired, converting a resulting (Z-cycloalkano)[d]thiazoline-2-one, which is unsubstituted in the 3-position into a 3-hydrocarbon-(Z-cycloalkano)[d]thiazoline-2-one, and/or, if desired, resolving any racemate into its antipodes, and/or, if desired, converting a resulting salt into the free base, and/or, if desired, converting a free base into a salt or a quaternary ammonium compound thereof.

X, $X_1$, Y and $Y_1$ may appropriately be selected according to general chemical knowledge from the group of substituents consisting of free or reactive esterified or etherified hydroxyl groups, free or etherified mercapto groups or free or mono-lower hydrocarbon substituted amino groups. Esterified hydroxyl groups are especially hydroxyl groups esterified with strong inorganic acids such as hydrohalic acids, e.g. hydrochloric, hydrobromic or hydriodic acid, or sulfuric acid; or strong organic acids, e.g. p-toluene sulfonic acid. As etherified hydroxyl groups there may be mentioned, for example, lower alkoxy, e.g. methoxy or ethoxy, groups, which may be also part of a carbalkoxy group. Etherified mercapto groups are preferably lower alkyl mercapto, e.g. methyl mercapto, groups. In these compounds hydrogen atoms being part of one of the substituents, X, $X_1$, Y, $Y_1$ and E may give rise to tautomerism by being shifted to neighboring atoms, thus accommodating the double bonds in the above formulae, provided that the reactivity of the compounds intended for the desired purpose is not affected. These reactions are carried out in the usual manner, if necessary in the presence of condensing agents, such as lower alkanolates, amides or hydrides of alkali metals, e.g. lithium, sodium or potassium methanolate, ethanolate, amide or hydride.

A further modification of the process for the preparation of the compounds of this invention comprises treating a 2-thiocyano-cycloalkanone, to the cycloalkane ring of which is attached a group Z of the above-given meaning, or a salt thereof with a hydrolyzing reagent, and, if desired, carrying out the optional steps as described hereinbefore. Hydrolyzing agents used in this reaction are, for example, aqueous mineral acids, e.g. aqueous solutions of hydrochloric or sulfuric acid; or aqueous alkaline agents, such as hydroxides, carbonates or hydrogen carbonates of an alkali metal, e.g. lithium, sodium or potassium, or an alkaline earth metal, e.g. calcium. The treatment with such hydrolyzing agents usually brings about hydrolysis of the thiocyano group and the ring closure in one operation. However, the formation of the thiazoline ring may also be carried out stepwise by first hydrolyzing the thiocyano compound under mild conditions to the corresponding carbamylthio derivative, for example, by treatment with an alkaline agent as described above and then cyclizing, for example, by treatment with a mineral acid or by heating. The 2-thiocyano-cycloalkanones, used as the starting materials, may be prepared, for example, by treatment of the corresponding 2-halogeno-cycloalkanones, e.g. 2-bromocyclo alkanones with an alkali or an alkaline earth metal thiocyanate, e.g. barium thiocyanate.

An additional method for the preparation of the compounds of this invention comprises converting in cycloalkano[d]thiazoline compounds of the formula:

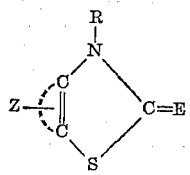

or the tautomeric forms and/or the salts of such compounds, in which Z and R, as well as the cycloalkano ring have the meaning given above, and in which E represents a substituent convertible into an oxo group or a hydroxyl, the substituent E into a hydroxyl or an oxo group and, if desired, carrying out the optional steps as described hereinbefore.

Substituents E convertible into a hydroxyl or an oxo group, are, for example, an esterified or etherified hydroxyl group, a free or substituted amino or imino group, or a free or substituted methylene group. In compounds used as starting materials a hydrogen atom being part of the substituent E or of a group formed during the reaction or attached to the nitrogen atom of the thiazoline ring, may give rise to tautomerism by shifting to neighboring atoms, thus accommodating the double bonds in the above formula, provided that the reactivity of the compounds intended for the desired purpose is not affected.

Etherified hydroxyl groups, such as lower alkoxy, e.g. methoxy or ethoxy groups, or esterified hydroxyl groups, such as halogen, e.g. chlorine or bromine, atoms, are hydrolyzed in the usual manner, e.g. by treatment with strongly acidic or alkaline reagents. If the esterified hydroxyl group is a halogen atom, it may be converted directly into the oxo group by treatment with a metal hydroxide, e.g. silver hydroxide, or may be first converted into an etherified hydroxyl group such as a lower alkoxy group by treatment with an alkali metal lower alkanolate, e.g. sodium methylate or potassium ethylate. The lower alkoxy group is then split, for example, by treatment with an acid such as hydrochloric acid. These steps can also be combined by treating a 2-halogeno-cycloalkano[d]thiazole with the desired lower alkanol and a strong acid, e.g. ethanol and hydrochloric acid. The conversion of the lower alkoxy group into the oxo group may also be accomplished by isomerization of a corresponding 2-lower alkoxy-thiazole derivative in an acidic medium under simultaneous alkylation of one of the nitrogen atoms.

A free amino group may be diazotized and then decomposed, e.g. by treatment with phosphoric acid or by heating, to yield the hydroxyl compound. Furthermore, a free amino group may be diazotized and the diazo compound decomposed in the presence of a cupric halide, e.g. chloride, and the halogen, e.g. chlorine, atom thus introduced may be converted into the oxo group according to the above-described method. A 2-imino-3-R-cycloalkano[d]thiazoline, in which R stands for a hydrocarbon radical, especially lower alkyl, e.g. methyl, and which contains attached to the cycloalkano ring the radical Z of the above-given meaning, may be treated with nitrous acid, formed by reacting an alkali metal nitrite, e.g. sodium nitrite, with a lower alkanoic acid, e.g. glacial acetic acid, and the resulting 2-nitroso-imino-3-R-cycloalkano[d]thiazoline may then be decomposed at a temperature ranging from about 50° C. to 250° C., preferably in a high-boiling solvent, such as a high-boiling hydrocarbon, e.g. xylene, to yield directly the desired 3-R-cycloalkano-[d]-4-thiazoline-2-one.

A free amino group or substituted amino group such as, for example, an anilino group, may be converted into the oxo group by treatment with hydrolyzing agents, such as strong acids, e.g. sulfuric acid in alcoholic solution. Furthermore, a substituted imino group such as the phenylimino group undergoes the same hydrolysis; upon treatment with hydrochloric acid in ethanol, the desired thiazoline-2-one derivative is formed.

An unsubstituted or substituted methylene group in the 2-position of the thiazoline ring may be oxidatively degradated to the oxo groups, e.g. by treatment with chromic acid. A substituted methylene group is more especially the dicarbalkoxymethylene group.

The starting materials used in this process are known or may be prepared according to known procedures. For example, a 2-amino-cycloalkano[d]thiazole, to the cycloalkano ring of which is attached the group Z having the above-given meaning, may be prepared by reacting a 2-bromo-cycloalkanone, containing the group Z, with a thiourea at a temperature ranging from about 100 to 150° and isolating upon chilling the hydrobromide salt of the desired 2-amino-cycloalkano[d]thiazole compound.

The starting materials used in these processes may also be formed in reactions where conditions apply which convert them into the desired end products according to one of the above-described processes. Thus, as shown above, a 2-halogeno-cycloalkanone may be reacted with a lower alkyl thiocarbamate which presumably results in the intermediary formation of a 2-alkoxy-cycloalkano[d]thiazole, which under the reaction conditions is decomposed to the desired cycloalkano[d]thiazoline-2-one.

The replacement of the hydrogen atom attached to the nitrogen atom of the thiazoline ring by a hydrocarbon radical may be accomplished according to the procedure described hereinbefore, for example, by treating the resulting thiazoline derivative, preferably in the form of an acid addition salt, with an alkali metal amide, e.g. sodium amide, or alkali metal hydride, e.g. sodium hydride in a high-boiling hydrocarbon solvent, e.g. benzene or toluene, and reacting the alkali metal, e.g. sodium, salt thus formed with a halogenated hydrocarbon compound, such as, for example, a lower alkylhalide, e.g. methyliodide.

My invention also comprises any modification wherein a compound obtainable as an intermediate in any step of the process of the invention is used as starting material and the remaining step(s) is (are) carried out, as well as any new intermediates.

The starting materials are known or can be obtained according to methods known in the art for the preparation of analogous compounds. Advantageously such starting materials are used as lead to final products described hereinbefore as especially valuable.

What is claimed is:

1. 4-[piperidino-(N) - methyl] - cyclohexano[d]thiazoline-2-one.

2. The hydrobromide of the compound of claim 1.

3. The hydrochloride of the compound of claim 1.

4. 1-4-[piperidino-(N)-methyl]-cyclohexano[d]thiazoline-2-one L-tartrate.

5. 4-[3 - methyl - piperidino-(N)-methyl]-cyclohexano[d]thiazoline-2-one.

6. 4-[piperidino - (N)-methyl]-cyclopentano[d]thiazoline-2-one.

7. 4-[3-hydroxy - piperidino-(N)-methyl]-cyclohexano[d]thiazoline-2-one.

8. 4-[3-hydroxymethyl - piperidino-(N)-methyl]-cyclohexano[d]thiazoline-2-one.

9. 2-bromo-6-(N,N-lower alkylene - imino - methyl)-cyclohexanone, in which the N,N-lower alkylene-imino group stands for a piperidino group.

10. 2-bromo-6-[piperidino - (N) - methyl] - cyclohexanone.

11. Process for the preparation of 2-bromo-6-[piperidino-(N)-methyl]-cyclohexanone hydrobromide which comprises treating a solution of 2[piperidino-(N)-methyl]-cyclohexanone hydrobromide in acetic acid with bromine.

12. A member of the group consisting of a 2-halogeno-(Z)-cycloalkanone, in which Z represents a member of the group consisting of N,N-lower alkylene-imino-lower alkyl, N,N-(hydroxy-substituted lower alkylene)-imino-lower alkyl, N,N-(hydroxy-lower alkyl substituted lower alkylene)-imino-lower alkyl and N,N-(lower alkyl-substituted lower alkylene)-imino-lower alkyl, attached to one of the carbon atoms of the cycloalkanone ring, which contains from 5 to 7 carbon atoms as ring members, and halogeno stands for a member of the group consisting of chlorine and bromine, and an acid addition salt thereof.

13. A member of the group consisting of 3-R-4-[4-lower alkyl-piperazino-(N)-methyl]-cyclohexano[d]thiazoline-2-one, in which R stands for a member of the group consisting of hydrogen and lower alkyl, and therapeutically acceptable acid addition salts thereof.

14. The optically active antipodes of the compounds of claim 15.

15. A member of the group consisting of a 3-R-(Z-cycloalkano)[d]thiazoline-2-one, in which R stands for a member of the group consisting of hydrogen and lower alkyl, the group Z represents a member of the group consisting of N,N-lower alkylene-imino-lower alkyl, N,N-(hydroxy-substituted lower alkylene)-imino-lower alkyl, N,N-(hydroxyl-lower alkyl substituted lower alkylene)-imino-lower alkyl and N,N-(lower alkyl-substituted lower alkylene)-imino-lower alkyl, attached to one of the carbon atoms of the cycloalkano ring, which contains from 5 to 7 carbon atoms as ring members, a therapeutically acceptable acid addition salt, a lower alkyl quaternary ammonium halide and a lower alkyl quaternary ammonium sulfate thereof.

16. In a process for the preparation of a member of the group consisting of a 3-R-(Z-cycloalkano)[d]thiazoline-2-one, in which R stands for a member of the group consisting of hydrogen and lower alkyl, the group Z represents a member of the group consisting of N,N-lower alkylene-imino-lower alkyl, N,N-(hydroxy-substituted lower alkylene)-imino-lower alkyl, N,N-(hydroxy-lower alkyl substituted lower alkylene)-imino-lower alkyl and N,N-(lower alkyl-substituted lower alkylene)-imino-lower alkyl, attached to one of the carbon atoms of the cycloalkano ring, which contains from 5 to 7 carbon atoms as ring members, a therapeutically acceptable acid addition salt, a lower alkyl quaternary ammonium halide and a lower alkyl quaternary ammonium sulfate thereof, the step which comprises treating a member of the group consisting of a 2-halogeno-cycloalkanone, which contains the group Z of the above-given meaning attached to one of the carbon atoms of the cycloalkanone ring having from 5 to 7 carbon atoms as ring members, and in which halogeno stands for a member of the group consisting of chlorine and bromine, and an acid addition salt thereof with a member of the group consisting of a salt and a lower alkyl ester of an N-R-thiocarbamic acid, in which R has the above-given meaning.

No references cited.